US006219904B1

(12) United States Patent
Debanne

(10) Patent No.: US 6,219,904 B1
(45) Date of Patent: Apr. 24, 2001

(54) AUTOMATED DEVICE FOR MAINTAINING WOODEN ELEMENTS ON A PRESSING TABLE FOR ASSEMBLING THEM

(76) Inventor: Christian Debanne, Quartier Royal, Saint-Cannat 13760 (FR)

( * ) Notice: Subject to any disclaimer, the term of this patent is extended or adjusted under 35 U.S.C. 154(b) by 0 days.

(21) Appl. No.: 09/308,676

(22) PCT Filed: Dec. 4, 1997

(86) PCT No.: PCT/FR97/02202

§ 371 Date: Jun. 4, 1999

§ 102(e) Date: Jun. 4, 1999

(87) PCT Pub. No.: WO98/24295

PCT Pub. Date: Jun. 11, 1998

(30) Foreign Application Priority Data

Dec. 4, 1997 (FR) .................................................. 96 15119

(51) Int. Cl.[7] ..................................................... B23P 21/00

(52) U.S. Cl. ................................ 29/701; 269/91; 29/809; 29/897.31; 29/798

(58) Field of Search .............................. 29/701, 798, 809, 29/897.31; 269/303, 910; 100/48

(56) References Cited

U.S. PATENT DOCUMENTS 4,741,523 * 5/1988 Sato et al. .
4,880,218 * 11/1989 Greene .
5,048,409 * 9/1991 Schulz .
5,092,028 * 3/1992 Harnden .
5,676,358 * 10/1997 Shamblin et al. .
5,810,341 * 9/1998 Williams .
5,867,905 * 2/1999 Whale et al. .

FOREIGN PATENT DOCUMENTS 2693148 1/1994 (FR) .
2707546 1/1995 (FR) .

* cited by examiner

*Primary Examiner*—Tom Hughes
*Assistant Examiner*—Steve Blount
(74) *Attorney, Agent, or Firm*—Greenblum & Bernstein P.L.C.

(57) ABSTRACT

Automated device for maintaining and assembling wooden elements on a pressing table. The device comprises a mobile gantry adapted to be movably mounted to a pressing table. The mobile gantry has at least one motor driven pressing jack and a rail. A motor driven motoring unit is slidably mounted to the rail. A plurality of spindles are arranged on the rail. A plurality of saw logs are mounted to the spindles, each saw log having a ring-shaped groove, an elastic element, and a bore for receiving a spindle. The plurality of spindles constitute a magazine for storing the plurality of saw logs. The motoring unit includes a vertically mobile rod comprising one of a single rod and a double rod. The vertically mobile rod comprises a lower end having a clamp adapted to remove a saw log from a spindle. The clamp comprises a U-shaped plate having an opening which is adapted to engage the ring-shaped groove of a saw log, the clamp comprising an elastic element adapted to engage the saw log. A computer system is also included for operating the mobile gantry, the motoring unit, and the jack.

20 Claims, 2 Drawing Sheets

AUTOMATED DEVICE FOR MAINTAINING WOODEN ELEMENTS ON A PRESSING TABLE FOR ASSEMBLING THEM

BACKGROUND OF THE INVENTION

1. Field of the Invention

The present invention relates to an automated device for maintaining wooden elements on a pressing table for assembling them.

The device is adapted for manufacturing different types of assemblies, such as frame elements, and particularly prefabricated trusses of restricted dimensions known as "gable trusses," and widely used in traditional construction for supporting sloping roofs.

2. Description of Background and Relevant Information

The gable trusses are made by the triangular assembly, on a pressing table, of two principal rafters and a tie beam reinforced by judiciously arranged triangulation parts. The components of the gable trusses are arranged on the pressing table and are generally maintained by mobile abutments sliding in the metal plate grooves of the table and blocked by screws. "Connectors," constituted of metal plates with claws, are then embedded at the junction points by means of mobile jacks borne by a gantry sliding longitudinally above the table.

Most often, the adjustment and setting of the gable trusses, as well as the control of the pressing by the jacks, is done manually. The logs are positioned on the table and maintained by abutments that are positioned manually. The connectors are then pre-embedded by means of a hammer, then the operator positions the jacks above the connectors and activates a lever that allows pressing by the descent of the jacks. The drawback is that, since the adjustment operations are manual, the time required is substantial, causing high labor costs, and the equipment used (mobile abutments, rails) is quickly damaged.

French patent No. 2 693 148, filed by Mr. DEBANNE and Mr. PORTALIER, discloses a device allowing the automatic positioning of the maintaining abutments in the metal plate grooves of the table due to a motoring unit operated by a computer assembly which also controls the movements of the mobile gantry and the pressing jacks.

This equipment has the drawback of requiring a table of a predetermined type, equipped with grooves machined into the plate, which raises its manufacturing costs. Furthermore, the longitudinal displacement of an abutment must be done in three steps, first of all, go to the end of the transverse groove in which it is initially located, then, pass along a longitudinal groove located along the edge of the table, then finally get into a new transverse groove. In cases of maladjustment, the deterioration risks incurred by the abutments, the grooves or the mandrill are substantial.

U.S. Pat. No. 2,707,546, filed on behalf of Mr. Christian DEBANNE, discloses a device allowing the use of any type of table authorizing unlimited displacements of the maintaining elements over the entire surface of the plate and minimizing the consequences of possible malfunctions of the mandrill or of the computer system. This device uses, for maintaining the parts to be assembled, saw logs constituted of cylindrical blocks equipped at the lower portion with tips that get embedded in a wooden plate covering the pressing table, these saw logs being positioned by means of a hollow mobile mandrill equipped on its inner surface with lugs that can slide into the "L"-shaped grooves provided at the periphery of the saw logs and arranged such that the saw logs can be released or made integral with the mandrill by making the latter rotate a fraction of a revolution in one direction or the other.

Not only do the combination of the rotational and translational movements run the risk of decreasing the reliability of the system, but the positioning of the mandrill above a saw log requires great precision which can only be obtained by substantially slowing down the horizontal movements of the mandrill. Above all, the displacement of a series of saw logs to achieve a new configuration requires numerous movements of the motoring unit and the gantry due to the fact that each saw log must be brought to its new location before the system can go back to find the next saw log.

SUMMARY OF THE INVENTION

The device according to the present invention overcomes these drawbacks. In addition to the use of any type of table, it allows the very quick displacement of a series of saw logs and has substantial reliability due to the elimination of the rotational movements of the system for grabbing the saw logs.

The invention provides for of a pressing table with a wooden plate and a mobile gantry comprising a magazine for storing saw logs utilizing vertical spindles mounted under a rail fixed laterally on the gantry and on which can be strung the saw logs which comprise a vertical bore with spring balls maintaining them due to grooves provided on the spindles, a motoring unit sliding along the rail, adapted for placing, removing and storing the saw logs, being equipped with a vertically mobile clamp comprising a lateral U-shaped opening capable of being inserted in ring-shaped grooves provided at the periphery of the saw logs.

The invention therefore provides for an automated device for maintaining wooden elements on a pressing table for assembling them, adapted to the manufacture of different types of assemblies, such as frame elements, particularly prefabricated trusses of restricted dimensions known as "gable trusses," comprising a longitudinally mobile gantry bearing at least one pressing jack as well as a rail on which slides a motoring unit whose role is to position and displace the saw logs for maintaining the parts to be assembled. The movements of the mobile gantry, the motoring unit and the jack(s) are motor-driven and operated by a computer system. The maintaining saw logs comprise a vertical bore allowing them to be strung by the bottom onto vertical spindles arranged under the rail, and constituting a magazine for storing said saw logs. The motoring unit comprises a single or double rod, vertically mobile and equipped at its lower portion with a clamp, formed of a horizontal plate having a U-shaped lateral opening capable of being inserted in ring-shaped grooves provided at the periphery of the saw logs, each of these being equipped with an inner spring ball ensuring their immobilization on the spindles.

The invention also provides for a device characterized in that each of the spindles comprises a series of circular grooves distributed over their height and in which the spring balls of the saw logs can penetrate so as to immobilize the latter at a predetermined height. Each of the spindles may comprise a shoulder arranged at their base and arranged such that when the saw log located at the lowest point is removed, the saw logs located above descend by their own weight and are retained by the spring ball of the lower saw log pressing on said shoulder. When a saw log is inserted at the base of a spindle, the saw logs that are already present are pushed upwards. The spindles may be parallel with respect to one another and fixed along the length of the rail, at its lower portion. The spindles may be mounted on a rotating spring barrel, fixed under the rail and whose rotation allows bringing the spindle on which the selected saw log is located in front of the clamp. The U-shaped lateral opening of the clamp may comprise an elastic element, such as a spring ball, that is predetermined for maintaining a saw log in the clamp while allowing its insertion or its extraction by exerting a slight force. The motoring unit may be arranged such that the clamp can be positioned facing any saw log present on a spindle and be inserted in the ring-shaped groove, by using only the movements allowing the saw logs to be fixed on the plate, or allowing them to be removed, namely the horizontal movement of the unit along the length of the rail and the vertical movement of the clamp. The movements of the mobile gantry and the motoring unit may be operated by an electronic assembly, the data relative to the positions of the saw logs for a predetermined configuration being prepared on a standard computer, due to an ad hoc software, and sent by an appropriate device to the electronic system. The position of each saw log may be saved after each movement, so as to allow its retrieval and to ascertain the displacement to be made for a new, later configuration.

BRIEF DESCRIPTION OF THE DRAWINGS

On the attached drawings, given by way of non-limiting examples of embodiments of the present invention.

DETAILED DESCRIPTION OF THE INVENTION

Figure 1:
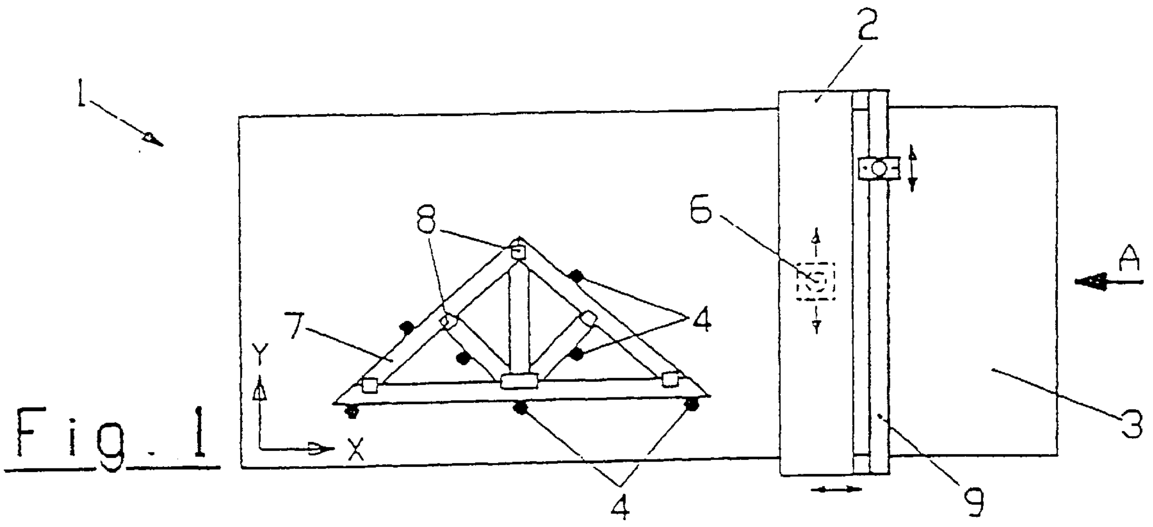
FIG. 1 shows a pressing table seen from the top, with a gable truss in place.
Figure 2:
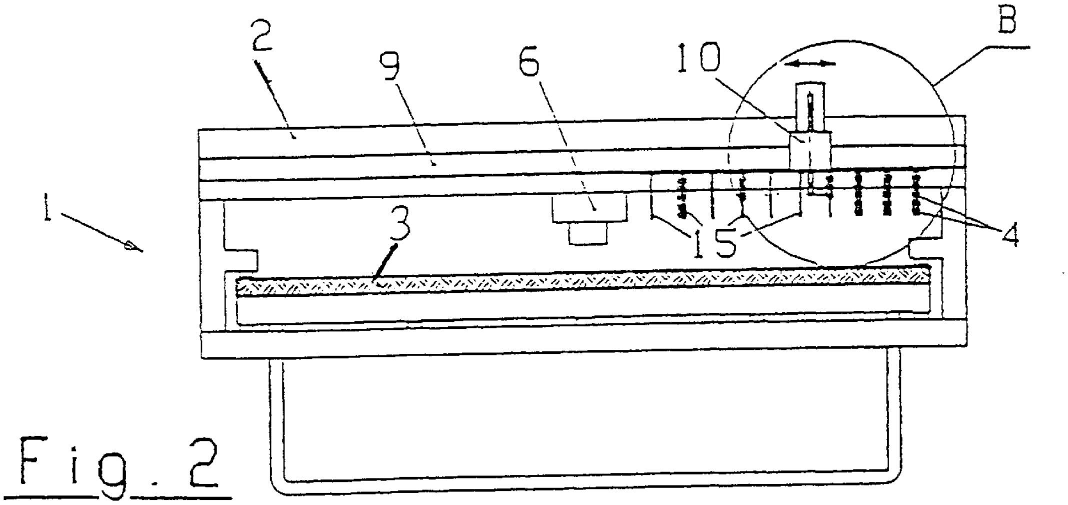
FIG. 2 shows the table seen from the end, along Arrow A of FIG. 1.

The device, FIGS. 1–7, is mounted on a pressing table 1 comprising a mobile gantry 2, perpendicular to the table 1 and being displaced longitudinally above the latter.

The plate 3 of the pressing table 1 is wooden, without grooves, and can be, for example, a plate of solid wood, plywood or pressed wood covering the entire surface of a metal table. Saw logs 4 for maintaining the parts to be assembled can be fixed in position due to tips 5 arranged at their lower portion and get embedded in the wood of the plate 8.

The mobile gantry 2 comprises one or several jacks 6, at least one of which can be 'propelled transversely to the longitudinal axis of the table 1. The role of these jacks 6 is to exert a strong pressure from the top downward in the direction of the plate 3.

After positioning the maintaining saw logs 4, the component parts of the gable trusses 7 are arranged on the plate 3, the connectors 8 are pre-embedded manually, then the mobile gantry 2 and a jack 6 are displaced successively above each connector 8 before activating the jack 6 for a final tightening.

The gantry 2 is laterally equipped with a rail 9 perpendicular to the axis of the pressing table 1, on which slides a motoring unit 10 that can be positioned above any point of the plate 3. This motoring unit comprises a single or double rod 11, vertically mobile and ending at its lower portion by a clamp 12, utilizing a horizontal plate having a predetermined lateral U-shaped opening so as to be inserted into the ring-shaped grooves 13 provided at the periphery of the saw logs 4. This opening comprises an elastic element 14, such as a spring ball, that is predetermined for maintaining a saw log 4 in the clamp 12 while allowing its insertion or its extraction by exerting a slight force.

Under the rail 9 are mounted several vertical spindles 15, each comprising a series of circular grooves 16 distributed along its height. These spindles 15 constitute a magazine for storing the saw logs 4 which comprise a vertical bore allowing them to be strung from the bottom onto these spindles 15, either manually or by utilizing the clamp 12. Each saw log 4 is equipped with an inner spring ball 17 arranged to immobilize it at a predetermined height by penetrating into one of the grooves 16.

Figure 7:
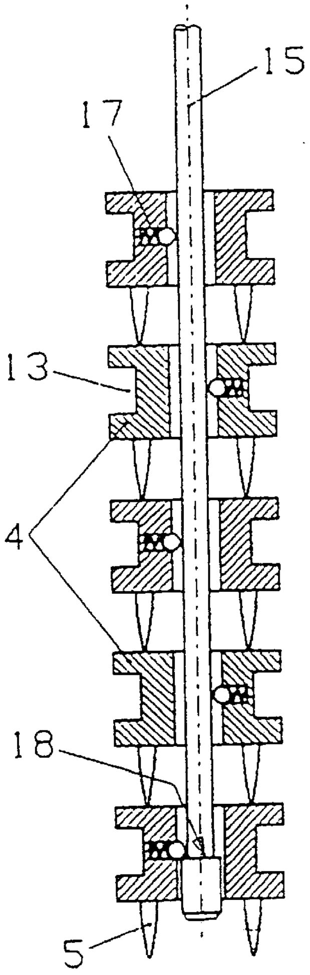

The circular grooves 16 can be replaced by a shoulder 18 arranged at the base of the spindles 15. When the saw log 4 located at the lowest point is removed, the saw logs located above descend by their own weight and are retained by the spring ball 17 of the lower saw log by pressing on the shoulder 18. In the same manner, when a saw log 4 is inserted at the base of a spindle 15, the saw logs that are already present are pushed upwardly. Thus, the clamp 12 movements are simplified, since the clamp 12 does not have to climb up along the spindles 15 to reach the saw logs 4 located at the top portion (FIG. 7).

The motoring unit 10 is arranged such that the clamp 12 can be positioned facing any saw log 4 present on a spindle 15 and be inserted in the ring-shaped groove 13, by using only the horizontal movement of the unit along the length of the rail 9 and the vertical movement of the clamp 31.

These same movements allow fixing the saw logs 4 on the plate 3 at predetermined locations, or removing them to store them on the vertical spindles 15. No rotational or longitudinal movement of the clamp 12 is necessary.

Figure 3:
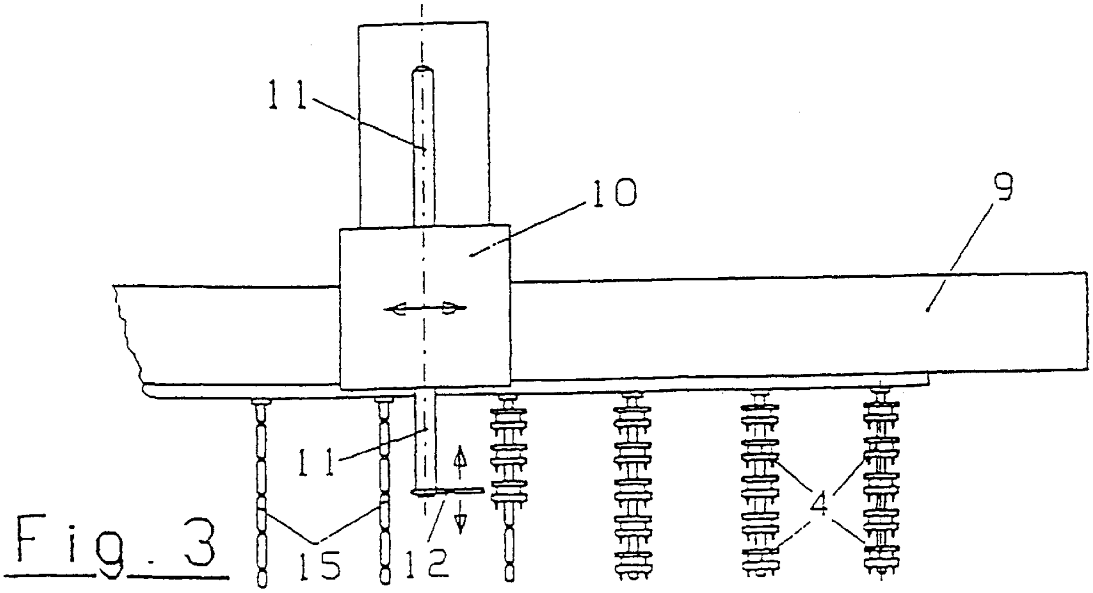
FIG. 3 is an enlargement of Detail B of FIG. 2.
Figure 4:
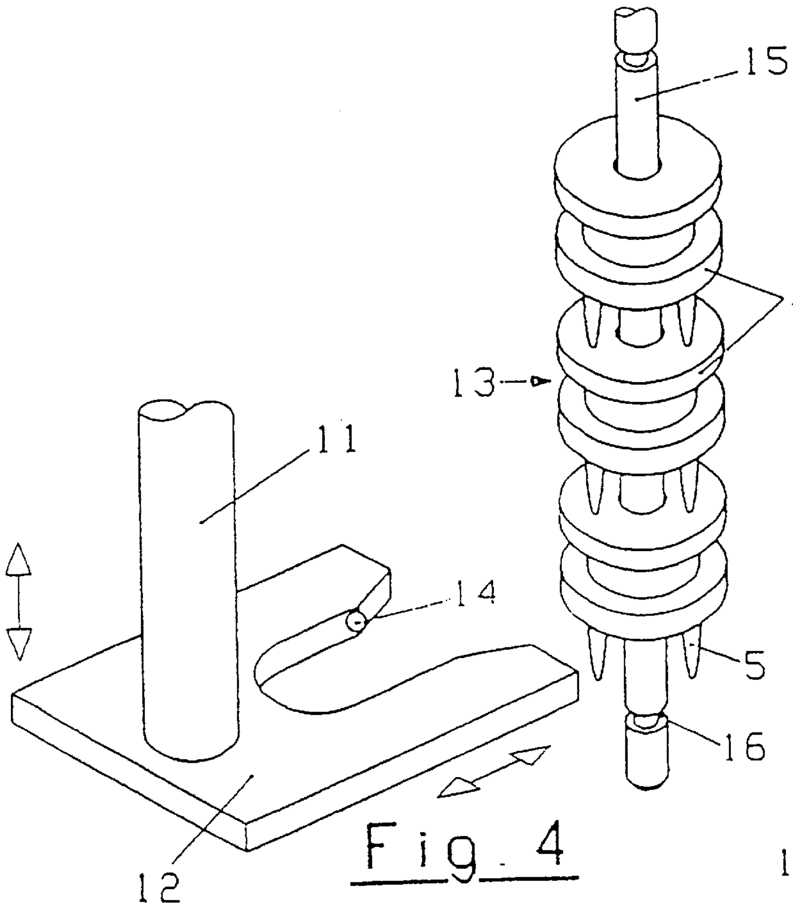
FIG. 4 is an axonometric view on a different scale showing the clamp of the motoring unit in the vicinity of a spindle bearing the saw logs.
Figure 5:
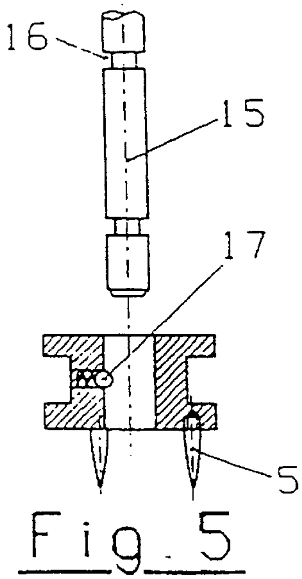
FIG. 5 shows in an axial cross-section a saw log and the lower end of a spindle.
Figure 6:
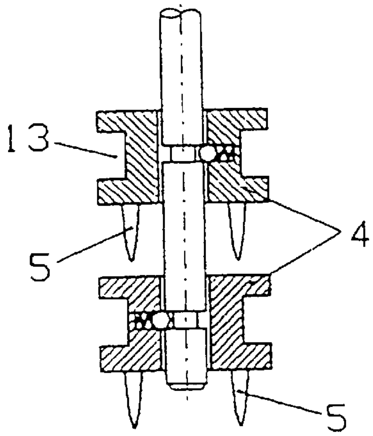
FIGS. 6 and 7 show in the same circumstance two spindle alternatives on which the saw logs are stored.

These spindles 15 can, for example, be parallel with respect to one another and fixed along the length of the rail 9 at its lower portion (FIG. 3). In this case, the clamp 12 will go around the bottom of the spindles 15 located in front of the spindle 15 on which the saw log 4 to be reached is located and will climb the length thereof up to the adequate height.

In an alternative embodiment, the spindles 15 are mounted on a rotating spring barrel, fixed under the rail 9 and whose rotation will allow bringing the spindle on which the selected saw log 4 is located in front of the clamp 12.

This arrangement makes it possible to substantially reduce the amplitude of the translational movements of the gantry 2 so as to modify a configuration of the saw logs 4, which considerably decreases the length of the operations and, consequently, the manufacturing costs. Indeed, during a configuration modification, all of the saw logs 4 from a zone are removed and arranged on the spindles 15 before bringing the gantry 2 over another zone. The same procedure is implemented for positioning the saw logs 4.

The movements of the mobile gantry 2, the motoring unit 10 and the jacks 6 are operated by an electronic assembly that can, for example, be installed in a box mounted on this gantry 2. The data relative to the positions of the saw logs 4 and the connectors 8 for a predetermined series of identical gable trusses 7 are prepared on a standard computer, due to an ad hoc software, and sent by an appropriate device, such as a cable or a diskette, to the electronic assembly. The position of each maintaining saw log 4 is saved after each movement, allowing it to be retrieved and to ascertain the displacement to be made for a new, later configuration.

The positioning of the various component elements maximizes the useful effects of the invention which have not been obtained by similar devices today.

What is claimed is:

1. An automated device for maintaining and assembling wooden elements on a pressing table, the device comprising:

a mobile gantry adapted to be movably mounted to a pressing table;

the mobile gantry having at least one motor driven pressing jack and a rail;

a motor driven motoring unit being slidably mounted to the rail;

a plurality of spindles arranged on the rail;

a plurality of saw logs mounted to the spindles, each saw log having a ring-shaped groove, an elastic element, and a bore for receiving a spindle;

the plurality of spindles constituting a magazine for storing the plurality of saw logs;

the motoring unit including a vertically mobile rod comprising one of a single rod and a double rod;

the vertically mobile rod comprising a lower end having a clamp adapted to remove a saw log from a spindle;

the clamp comprising a U-shaped plate having an opening which is adapted to engage the ring-shaped groove of a saw log, the clamp comprising an elastic element adapted to engage the saw log; and a computer system for operating the mobile gantry, the motoring unit, and the jack.

2. The device of claim 1, wherein the device is adapted for manufacturing different types of assemblies.

3. The device of claim 2, wherein the assemblies comprise frame elements.

4. The device of claim 3, wherein the frame elements comprise one of trusses and gable trusses.

5. The device of claim 1, wherein the motoring unit is adapted to remove saw logs from the magazine and place them on the pressing table.

6. The device of claim 1, wherein the spindles are vertically oriented under the rail.

7. The device of claim 1, wherein each spindle comprises a plurality of circular grooves, each groove being adapted to engage the elastic element of a saw log.

8. The device of claim 1, wherein the saw logs are arranged one above the other on each of the spindles.

9. The device of claim 1, wherein each of the spindles comprises a shoulder at one end, the shoulder being adapted to engage the elastic element of a saw log.

10. The device of claim 1, wherein the plurality of spindles are arranged parallel to one another and fixedly arranged along a length of the rail.

11. The device of claim 1, wherein the plurality of spindles are mounted on a rotating spring barrel which is fixedly arranged under the rail.

12. The device of claim 1, wherein the elastic element of the clamp comprises a spring ball, the spring ball being adapted to assist in retaining a saw log in the clamp.

13. The device of claim 1, wherein the elastic element of each of the saw logs comprises a spring ball, the spring ball being adapted to assist in retaining a saw log on the spindle.

14. The device of claim 1, wherein the motoring unit is adapted to remove a saw log from a spindle positioned above the pressing table and to position the saw log on the pressing table.

15. The device of claim 1, wherein the motoring unit is movable in a direction transverse to a movement of the mobile gantry.

16. The device of claim 1, wherein each of the mobile gantry and the motoring unit are movably operated by the computer system, and wherein the computer system utilizes a predetermined configuration corresponding to placement of the wooden elements, which configuration is prepared on a standard computer to generate data for positioning the saw logs on the pressing table.

17. The device of claim 16, wherein the computer system is adapted to save the predetermined configuration.

18. The device of claim 1, wherein the pressing table is horizontally disposed.

19. An automated device for maintaining and assembling wooden elements on a pressing table, the device comprising:

a computer system;

a mobile gantry adapted to be movably mounted to a pressing table and being operated by the computer system;

the mobile gantry having at least one motor driven pressing jack and a rail and being operated by the computer system;

a motor driven motoring unit being slidably mounted to the rail and being operated by the computer system;

a plurality of spindles arranged on the rail;

a plurality of saw logs mounted to the spindles, each saw log having a ring-shaped groove, an elastic element, and a bore for receiving a spindle;

the plurality of spindles constituting a magazine for storing the plurality of saw logs;

the motoring unit including a vertically mobile rod comprising one of a single rod and a double rod;

the vertically mobile rod comprising a lower end having a clamp adapted to remove a saw log from a spindle; and the clamp comprising a horizontal U-shaped plate having a lateral opening which is adapted to engage the ring-shaped groove of a saw log, the clamp comprising an elastic element adapted to engage the saw log.

20. An automated device for maintaining and assembling wooden elements on a pressing table, the device comprising:

a mobile gantry adapted to be movably mounted to a pressing table;

the mobile gantry having at least one motor driven pressing jack and a rail;

a motor driven motoring unit being slidably mounted to the rail;

a plurality of spindles arranged on the rail;

a plurality of saw logs mounted to the spindles, each saw log having a ring-shaped groove, an inner spring ball, and a bore for receiving a spindle;

the plurality of spindles constituting a magazine for storing the plurality of saw logs;

the motoring unit including a vertically mobile rod comprising one of a single rod and a double rod;

the vertically mobile rod comprising a lower end having a clamp adapted to remove a saw log from a spindle;

the clamp comprising a horizontally arranged U-shaped plate having a lateral opening which is adapted to engage the ring-shaped groove of a saw log, the clamp comprising a spring ball adapted to engage the saw log; and a computer system for operating the mobile gantry, the motoring unit, and the jack.

* * * * *